Dec. 15, 1959     E. O. OLSEN     2,917,715
MODULATOR
Filed Dec. 26, 1957
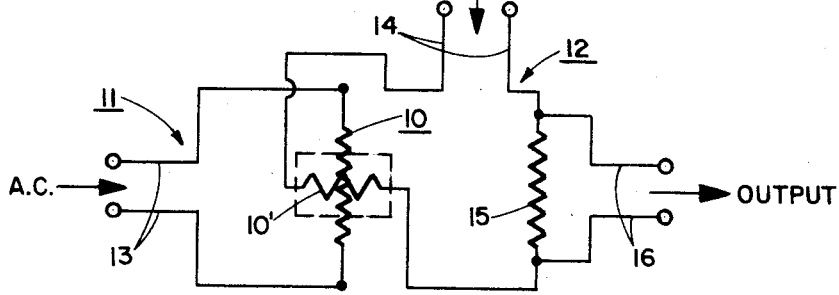
FIG. I
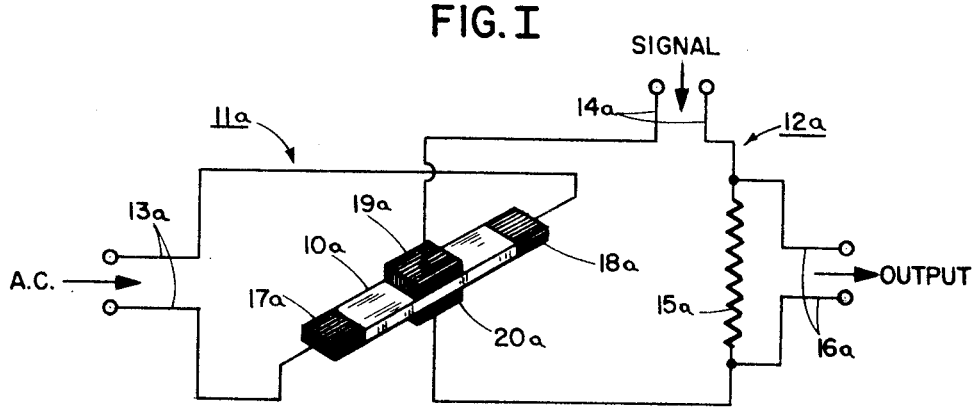
FIG. II
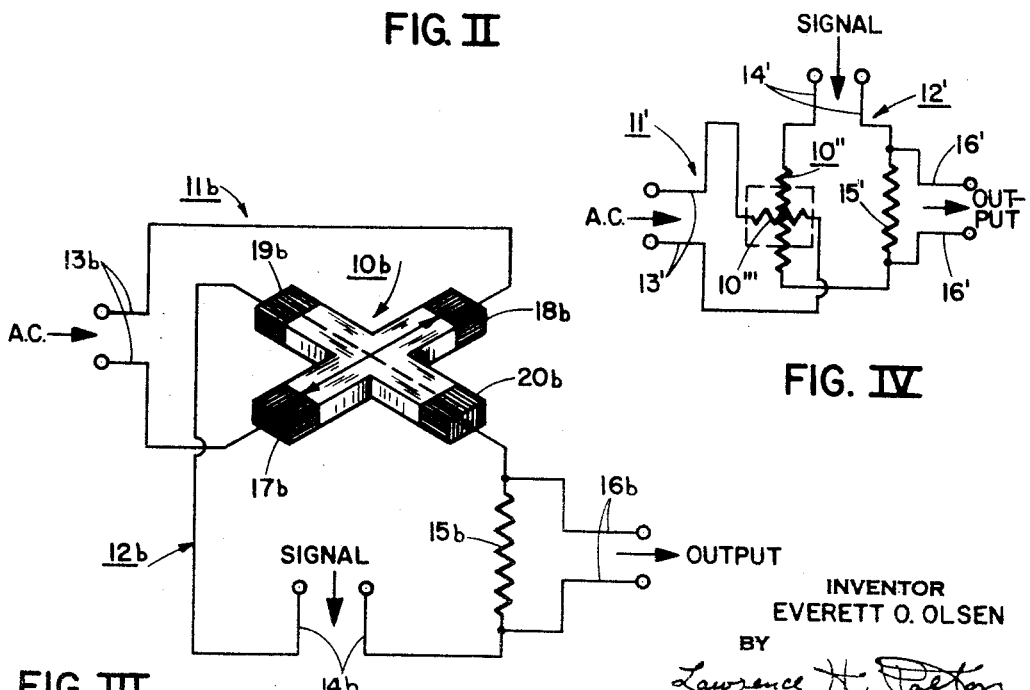
FIG. III     FIG. IV
INVENTOR
EVERETT O. OLSEN
BY
Lawrence H. Patton
AGENT United States Patent Office 2,917,715
Patented Dec. 15, 1959

2,917,715

MODULATOR

Everett O. Olsen, Wrentham, Mass., assignor to The Foxboro Company, Foxboro, Mass., a corporation of Massachusetts Application December 26, 1957, Serial No. 705,257

1 Claim. (Cl. 332—4)

This invention relates to electrical modulation devices, and is particularly concerned with an automatic, wholly electrical circuit arrangement for this purpose.

Modulation is a useful step in many forms of electrical circuitry. This invention provides means for automatically modulating any form of direct or alternating electrical current on a wholly electrical basis, using an electrical resistance change effect.

This invention, in order to accomplish this purpose, provides an electrical association of two circuits with an element which is at least in part common to both, in the form of a special type of electrical resistor. This resistor is formed of nonlinear resistance material in which electrical current varies as a power of the applied voltage. That is to say, as current through the resistor is varied, the resistance value of the resistor changes in accordance therewith. As an example of materials which are suitable for such a resistor, silicon carbide, pressed and bound with a ceramic binder under suitable firing conditions of relatively high temperatures, is cited. The controlling factor is the variation of resistance upon variation of current and other suitably similar materials are acceptable as long as they have this characteristic.

While this device is useful as a modulator of alternating current or pulsating direct current or the like, an illustrative example of its usefulness is in the modulation of direct current by alternating current. Such direct current is defined for the purposes of this invention as that current which in a particular application is ordinarily considered and referred to as direct current, although it may or may not have a cycle of its own, usually a slow pulsing.

In the handling of small values of direct current, it is often necessary to provide substantial amplification therefor, to make it effective for a desired purpose. For example, in industrial instrumentation systems, there are sensing elements such as thermocouples, resistance devices, and the like which produce small value direct current changes in representation of changes in variable conditions, such as temperature for example. In order to indicate, record or operate from these representations, it becomes necessary to amplify them. This has been done in the past by producing an unbalanced condition in a somewhat complicated and expensive Wheatstone bridge type of alternating current circuit or by operating a mechanical rectifier or interrupter and thereafter amplifying the alternating or pulsating direct current output thereof. Thus it is seen that because direct current is difficult and expensive to amplify properly, prior art systems, in an involved manner, translated small value direct current representations into more easily amplified alternating currents.

Thus as one application, the electrical system of this invention provides the advantages of obtaining alternating current, in the form of pulsating direct current, from small value direct current input signals, in automatic, simple, and wholly electrical fashion.

This invention, therefore, comprises a modulator current circuit to which alternating current or pulsating direct current may be applied as a modulator, and a signal circuit which has an input for the signal current to be modulated, and an output resistor in the signal circuit with output leads taken across this output resistor wherein one of these circuits includes a special nonlinear resistance material resistor as described above, and the other of the circuits includes at least a part of this special resistor.

Thus, this invention provides a new and improved modulation system which is completely electrical and which is operationally based on an electrical resistor the resistance of which varies with the application of varying current thereto.

It is accordingly an object of this invention to provide a new and improved electrical modulator.

It is a further object of this invention to provide a pair of circuits with minimum coupling between the circuits based on essentially mutually electrically perpendicular association of the circuits as connected to a resistor common to both circuits.

Other objects and advantages of this invention will be in part apparent and in part pointed out hereinafter, and in the accompanying drawings, wherein:

Figure I is a circuit diagram illustrating the combination of a modulator current circuit and a signal current circuit in accordance with this invention;

Figure II is a duplication of the circuitry of Figure I and further includes a showing of a structural arrangement of a nonlinear resistor in bar form in accordance with this invention;

Figure III is a view like that of Figure II except that the actual resistor is in the form of an X; and Figure IV is a schematic showing of an electrical circuit combination embodying this invention, this system being like that of Figure I except that the connections to the nonlinear resistor are reversed with respect to the alternating current and the direct current circuit.

Figure I illustrates, according to this invention, the use of an electrical resistor 10 as a common element in the association of a modulating current circuit 11 with a signal current circuit 12. The resistor 10 is made of nonlinear resistance material in which electrical current varies as a power of the applied voltage. That is to say, the resistance value of the resistor 10 may be varied by changing the value of electrical current being passed therethrough. This is accomplished, for example, by applying alternating current to the resistor 10. The rise and fall of the alternating current results in a constantly changing value of resistance in the resistor 10. An example of such resistance material is silicon carbide, pressed and heated with a ceramic binder.

In the showing of Figure I, the resistor 10 is in series arrangement with and wholly in the modulator circuit 11. The signal circuit 12 includes a transverse contral portion of the resistor 10 indicated schematically and transversely as a resistance 10'. Thus, while the ends of the resistor 10 are connected in the modulator circuit 11 in the usual manner, the signal circuit 12 extends transversely through and includes the central portion of the resistor 10. This transverse portion which is indicated as the transverse resistance 10' is actually not a separate resistor but a part of the resistor 10. The connections of the resistor 10 and the resistance 10' may be reversed with respect to the modulator and signal circuits 11 and 12. (See Figure IV.)

Figure IV is an illustration of a circuit system closely similar to that shown in Figure I with like elements represented by "primed" reference numbers and with the difference that the nonlinear resistor 10″ is wholly included (in Figure IV) in the signal circuit 12′ and only partially included in the modulator circuit 11′. Such arrangement of the connections of the nonlinear resistor with resepect to the modulator and the signal circuits is a matter of selection according to the particular circuit application which is involved.

The modulator circuit 11 of Figure I is provided with alternating current input leads 13 and the signal circuit 12 is provided with input leads 14 for receiving an alternating current signal or a direct current signal, as desired. The signal circuit 12 is further provided with a series arranged second resistor 15 which is an ordinary resistor in the sense that it is not made of the special nonlinear resistance material of the resistor 10. The second resistor 15 provides a voltage drop output means across which the output of the signal circuit 12 is taken by means of output leads 16. In the case of a direct current signal this output of the direct current circuit 12 is alternating current in the form of pulsating direct current.

In the operation of the Figure I circuit system, with a direct current signal, alternating current is applied to the modulator circuit 11 and through the nonlinear resistor 10 therein, with the result that, on a steady predetermined basis, the resistance value of the resistor 10 is rising and falling with the rise and fall of the applied alternating current. At the same time, direct current is applied to the signal circuit 12 for passage through its portion 10' of the nonlinear resistor 10. Thus, it will be seen as the resistor 10 resistance value keeps changing, the direct current through the signal circuit 12 is interrupted (modulated) so that the output of the signal circuit 12 is pulsating direct current at double the modulating frequency, with the amplitude of these output pulses representing the amplitude of the direct current variable condition signal input to the signal circuit 12. This arrangement of the device of this invention is thus applicable to industrial instrumentation. For example, a small direct current signal may be applied to the signal circuit 12 and modulated into a pulsating direct current signal in the output 16. This alternating current may then be readily amplified and used for indication, recording, control, operation transfer, or a combination of these as desired. As another example, this device is useful when it is desired to determine when there is any direct current signal available at all, that is, the determination of presence of absence of direct current, or any current. The circuit system of this invention can be arranged to have no output whatsoever, unless there is a signal current applied to the signal circuit 12. In this form of detector system it is preferable for the circuit crossing (in the special resistor) to be perpendicular, to provide minimum coupling between the circuits. In such an arrangement, the modulator circuit 11 may be steadily energized by its alternating current with the value of the resistance of the resistor 10 constantly varying and acting as a sort of gate or interrupter for any signal current which may be applied to the signal circuit 12 and at the same time not only indicating the presence of such signal current, but indicating it in a useful form, such as a pulsating direct current output of a direct current signal system.

Fundamental frequency output is obtainable by suitable conventional biasing arrangements. Thus the output frequency may be the same as the modulating frequency, if desired.

Figure II is, from a circuit system standpoint, essentially the same as Figure I. The difference lies in the actual showing in Figure II of a bar type resistor 10a which is an actual structural showing of the resistor 10 of Figure I. In Figure II the modulator circuit is indicated at 11a, and the signal circuit is indicated at 12a, other parts of Figure II also being similarly related to their counterparts in Figure I. The nonlinear resistor 10a of Figure II is provided at its bar ends with electrically conductive metal contact plates 17a and 18a as a means of connecting the resistor 10a into the modulator circuit 11a. Similarly the signal circuit 12a is transversely connected to the bar resistor 10a through electrically conductive metal contact plates 19a and 20a. The operation of the overall circuit of Figure II is the same as that described with respect to Figure I.

The system of Figure III is essentially the same as the circuit system of Figure II except that the nonlinear resistor is provided in the form of an X as indicated at 10b, wherein the legs are perpendicular to each other and one whole leg of the X is included in the modulator circuit 11b and the other whole leg of the X is included in the signal circuit 12b. The perendicular crossings of the modulator and signal circuits as shown especially in Figure III illustrate the system according to this invention having minimum coupling between the modulator and signal circuits. The outer ends of each leg of the X are provided with electrically conductive metal contact plates, as indicated at 17b, 18b, 19b, and 20b, as means of properly associating the resistor with and into each of the associated electrical circuits, that is, the modulator circuit 11b and the signal circuit 12b. The other portions of the circuitry of the showing of Figure III are related to Figure II showing by using the same reference numerals except that each is modified by the letter "b" instead of "a." The perpendicularity of the circuit crossings should be electrical. Thus the Figure III X may be other than mechanically perpendicular if necessary to achieve electrical perpendicularity. Other mechanical forms may be used, if electrical perpendicularity is achieved.

It may be noted that in the particular instance given for material of the nonlinear resistor, that is silicon carbide, the resistor responds to an increase in current by providing a decrease in its resistance value. Thus the maximum peaks of alternating current fluctuation are represented in the resistor by minimum values of resistance.

When signal current changes also vary the resistance of the resistor, they may be, by predetermination in a particular application, made nominal with respect to the modulation resistance changes.

Figure IV is discussed hereinbefore.

This invention, therefore, provides a new and improved modulation system which is wholly electrical and which involves the use of a nonlinear resistor.

As many embodiments may be made of the above invention and as changes may be made in the embodiments set forth above without departing from the scope of the invention, it is to be understood that all matter hereinbefore set forth and shown in the accompanying drawings is to be interpreted as illustrative only and not in a limiting sense.

I claim:

For use in a variable condition measuring instrument device, wherein a measurement sensing element produces electrical error signals in the form of direct current of small magnitude, a multiple circuit electrical system for modulating said direct current with alternating current to transpose said direct current error signals into pulsating direct current signals which are essentially alternating current for the purpose of ready amplification, said system comprising, in combination, an error signal circuit and a modulating circuit having a central portion of a special resistor as the only element of said system which is common to said circuits, said special resistor being characterized in that the current therethrough varies as a power of the applied voltage as exemplified by a silicon carbide resistor pressed with a suitable ceramic binder, with said special resistor formed in X shape wherein one full leg is end to end wholly only in said signal circuit as a part thereof and the other full leg is end to end wholly only in said modulating circuit as a part thereof, the center of said X formed by the crossing of said legs thus providing said common element between said circuits as an electrically perpendicular transverse crossing of the electrical paths of said circuits to provide a minimum of coupling between said circuits, said error signal circuit including a pair of direct current input leads, a pair of alternating current output leads, a voltage drop output resistor, and said one full leg of said X resistor, said modulating circuit including a pair of alternating current input leads and said other full legs of said X resistor, and said X resistor having each full leg as a straight electrical path with end terminals comprising electrically conductive members which define the end portions of the connecting wires of said circuits to said special resistor essentially at the surface of said special resistor.

References Cited in the file of this patent

UNITED STATES PATENTS

| | | |
|---|---|---|
| 1,415,748 | Weintraub | May 9, 1922 |
| 2,273,704 | Grisdale | Feb. 17, 1942 |
| 2,294,908 | Hussey | Sept. 8, 1942 |
| 2,407,251 | Christensen | Sept. 10, 1946 |
| 2,459,104 | Gilbert | Jan. 11, 1949 |